(12) United States Patent
Glabe

(10) Patent No.: US 6,313,741 B1
(45) Date of Patent: Nov. 6, 2001

(54) FAULT DETECTION CIRCUIT FOR SENSORS

(75) Inventor: Klaus Glabe, Hannover (DE)

(73) Assignee: WABCO Standard GmbH, Hannover (DE)

( * ) Notice: Subject to any disclaimer, the term of this patent is extended or adjusted under 35 U.S.C. 154(b) by 0 days.

(21) Appl. No.: 08/362,747

(22) Filed: Dec. 22, 1994

Related U.S. Application Data

(63) Continuation of application No. 08/045,579, filed on Apr. 9, 1993, now abandoned, which is a continuation of application No. 07/394,392, filed on Aug. 15, 1989, now abandoned.

(30) Foreign Application Priority Data

Sep. 14, 1988 (DE) .................................................. 38 31 193

(51) Int. Cl.$^7$ ....................................................... B60Q 1/00
(52) U.S. Cl. ........................... 340/438; 73/121; 303/122; 324/535; 371/62; 701/76
(58) Field of Search ..................................... 340/453, 438, 340/454, 507, 635, 825.16; 303/92, 122; 364/426.01, 426.02; 324/535, 236; 371/61, 62; 73/121; 701/76

(56) References Cited

U.S. PATENT DOCUMENTS 4,085,979 * 4/1978 Leiber et al. ........................... 73/121
4,546,437 * 10/1985 Bleckman et al. .............. 364/426.01

FOREIGN PATENT DOCUMENTS

3234637 * 3/1984 (DE) .

* cited by examiner

*Primary Examiner*—Brent A. Swarthout
(74) *Attorney, Agent, or Firm*—Proskauer Rose LLP

(57) ABSTRACT

The present invention provides a sensor-fault detection circuit for use with either an inductive or capacitive-type sensor. The sensor-fault detection circuit conducts a test signal into the sensor circuit for testing such sensor circuit. A time difference measuring device is provided to analyze for correct duration of the transit time of a test signal or test pulse, respectively, passing through the sensor. In the event that the transit time does not fall within a predetermined range tolerance, a fault indication can be activated. The circuit can be used, for example, to test an inductive bar-type sensor to determine the speed of a wheel on a vehicle.

20 Claims, 2 Drawing Sheets

FAULT DETECTION CIRCUIT FOR SENSORS

This is a continuation of application Ser. No. 07/394,392 filed Aug. 15, 1989, now abandoned which is a continuation of application Ser. No. 08/045,579, filed Apr. 9, 1993, now abandoned.

The present invention relates, in general, to sensors which are normally employed in safety-related devices and, more particularly, this invention relates to a fault detection circuit for inductive and/or capacitive-type sensors, which during a testing cycle will feed a test signal into the sensor circuit.

BACKGROUND OF THE INVENTION

It is generally recognized that a sensor-fault detection circuit of this type is required in any instance where such sensors are to be employed in conjunction with safety-related devices. One particularly well known area where this applies is when these sensors are utilized in a vehicle anti-locking brake system. As a rule, inductive-type sensors are employed in such vehicle anti-lock brake system to measure the rotational speed of the wheels on such vehicle. In this application, it is obvious that these sensors are subjected to a number of undesirable conditions. These undesirable conditions include dirt, moisture and rather high vibration at times. Therefore, these sensors will exhibit a relatively high susceptibiity to failure. Consequently, it is imperative that any failure occurring in such a sensor be detected as quickly as possible. Such early detection being desirable in order to substantially eliminate a serious malfunctioning in the control of such anti-lock brake system.

A fault detection circuit for a vehicle anti-lock brake control system has been taught in the prior art. See, for example, German patent publication DE-OS 31 26 102. The fault detection circuit taught in this particular reference monitors the anti-lock brake control system while the vehicle is stopping. In order to accomplish this, a safety circuit disconnects each of the respective wheel speed sensing devices. After the wheel speed sensors are disconnected by the safety circuit, the same test signals are fed into one pair of control channels each. In this system, identical test signals pass through each of the two pairs of control circuits. At this point the fault detection circuit will compare the signals which are generated at the output end in each pair of such control circuits. During this comparison, the fault detection circuit makes the assumption that in the case of a properly functioning control circuit the generated signals will be the same at the respective points. However, in this known fault detection circuit, as soon as a non-agreement of these generated signal sequences can be detected such fault detection circuit causes a warning or switch signal to be produced. A check of the wheel speed sensors proper does not take place.

A fault detection circuit for a skid control system is also taught in German patent publication DE-OS 32 34 637. In this particular prior art fault detection circuit, the wheel speed sensors are also monitored with an astable multivibrator while the vehicle wheels are stopped. When the wheel speed sensor is connected and functioning properly in this system, a low-level natural frequency is produced. This low-level natural frequency is interrupted, however, in the case of a sensor malfunctioning. Such interruption occurs either by a short-circuit or by disconnection. Consequently, this will result in a different signal sequence as compared to the other operative wheel speed sensor circuits. This different signal sequence is perceived as a malfunction in this fault detection circuit. A major drawback with this fault detection circuit is that it is relatively complicated.

SUMMARY OF THE INVENTION

The present invention provides an improved sensor-fault detection circuit. Such sensor-fault detection circuit is particularly useful in conjunction with either an inductive or capacitive-type sensor. For testing purposes, the sensor-fault detection circuit feeds a test signal into the sensor circuit in a manner such that the transit time of the test signal passing through such sensor can be analyzed by means of a timing device.

OBJECTS OF THE INVENTION

It is, therefore, one of the primary objects of the present invention to provide an improved fault detection circuit for a sensor which is relatively simplistic in design.

Still another object of the present invention is to provide an improved fault detection circuit for a sensor which is either an inductive or capacitive-type sensor which can be connected to a time difference measuring device so that the impedance of such sensor can be exploited for the existence of a-fault being present in the sensor circuit.

An additional object of the present invention is to provide an improved fault detection circuit for a sensor in which both interrupt faults and any short-circuit faults which may exist within the sensor circuit can be detected by such fault detection circuit.

In addition to the specific objects and advantages of the fault detection circuit for a sensor described above, various other objects and advantages of the present invention will become more readily apparent to those persons who are skilled in the electronic sensor art from the following more detailed description of the present invention, particularly when such description is taken in conjunction with the attached drawing FIGS. and with the appended claims.

BRIEF DESCRIPTION OF THE INVENTION

Figure 1:
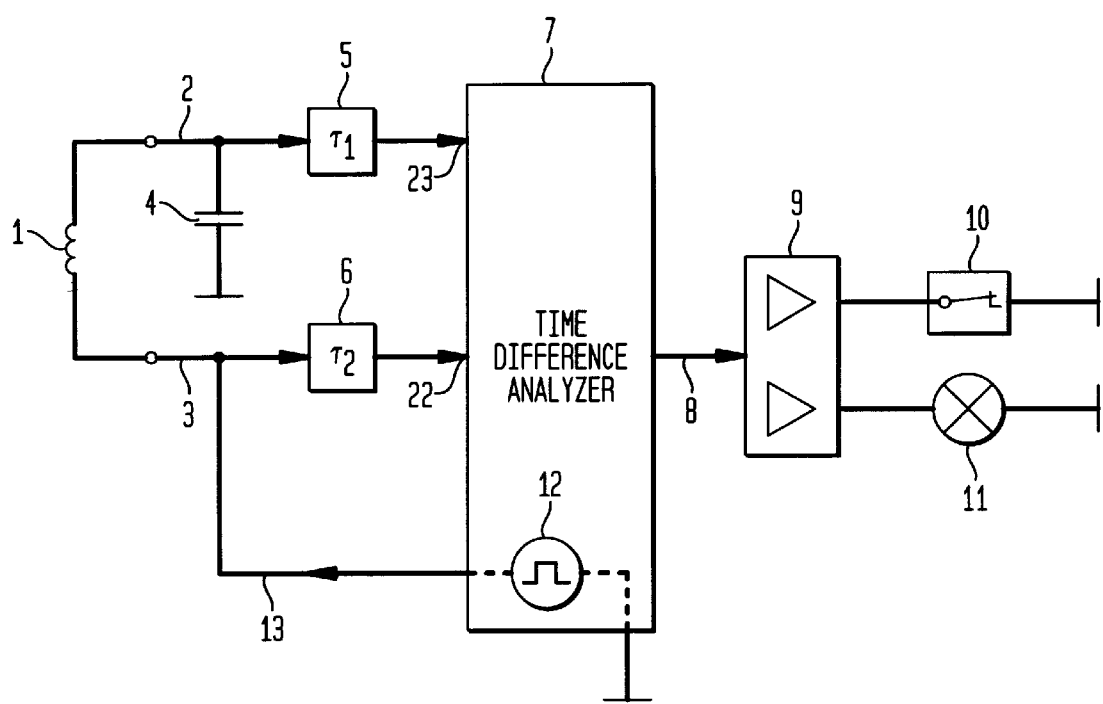
FIG. 1 is a block diagram which illustrates the presently preferred embodiment of the sensor-fault detection circuit having incorporated therein a time difference measuring circuit according to the present invention.

Prior to proceeding to the more detailed description of the present invention, it should be noted that in the drawing Figures identical components having identical functions have been identified with identical reference numerals for the sake of clarity.

As will become clear as the description proceeds, the simple design of the sensor-fault detection circuit, according to the present invention, is particularly advantageous. Because the sensors will usually be designed as either an inductive or capacitive-type sensor they, will already constitute a component part of the required timing element which effects a necessary delay of the test pulses. Therefore, as a rule, only one additional timing circuit will be required to achieve the sensor-fault detection circuit of the present invention.

Attention is now directed to FIG. 1. Illustrated in FIG. 1 is a diagram of the presently preferred configuration of the sensor-fault detection circuit. Included in this diagram is an inductive sensor, a test signal generator, additional timing elements and a time difference measuring device. Also illustrated in FIG. 1 is a disconnect and an indicator or signal device.

The inductive sensor 1 is illustrated in FIG. 1 as inductivity. Such inductive sensor 1 is electrically connected by way of a first connecting line 2 to a capacitor 4. In this invention, the inductive sensor 1 in conjunction with the capacitor 4 operate at the same time to constitute a timing element. In addition, by way of the first connecting line 2, such inductive sensor 1 is electrically connected to an input terminal of a first timing element 5. This first timing element 5 includes a predetermined delay time $T_1$. At the output terminal of such first timing element 5, an electrical connection is made to an input terminal of a time difference measuring and analyzer mechanism 7. From the output terminal of such time difference measuring or analyzer mechanism 7, an electrical signal line 8 is electrically connected to an input terminal of an amplification circuit 9. One output terminal of such amplification circuit 9 is electrically connected to an input terminal of a disconnect device 10. A second output terminal of such amplification circuit 9 is electrically connected to an input terminal of an indication or signal device 11. Incorporated into such time difference measuring or analyzer mechanisms 7 is a test-signal generator device 12.

The inductive sensor 1 is also electrically connected to a second connecting line 3. Such second connecting line 3 by way of a signal line 13 connects such inductive sensor 1 to the test-signal generator device 12. Additionally, in this manner, such test-signal generator device 12 interface is electrically connected to an input terminal of a second timing element 6. The second timing element 6 includes a predetermined delay time $T_2$. The output terminal of such second timing element 6 is electrically connected to another input terminal of the time difference measuring or analyzer mechanism 7.

The test-signal generator device 12 is configured as an electronic circuit that will generate electrical test signals at certain predetermined time intervals. Because, according to the present invention, the fault detection circuit also monitors the inductive sensor 1 circuit during the operation of such vehicle anti-lock brake system, these electrical test signals must be selected in a manner such that they will not adversely affect the desirable pulses being produced by such inductive sensor 1. For this reason, the electrical test pulses generated by the test-signal generator device 12 are fed into the second connecting line 3 and then pass through the inductivity of such inductive sensor 1 and then to the subsequent capacitor 4. This particular arrangement produces voltage pulses at the capacitor 4 which are offset in time. Furthermore, these voltage pulses are simultaneously present at the first timing element 5. This first timing element 5 has for one of its purposes to filter the pulses of the inductive sensor 1. Such first timing element 5 includes an RC element. Such RC element at its output will cause another time-offset of the voltage pulse. Such voltage pulse reaches the input terminal 23 of such time difference measuring or Analyzer device 7.

In the presently preferred arrangement of the invention, these electrical test pulses being fed into the second connecting line 3 are substantially simultaneously present at the second timing element 6. In view of the fact that both the first timing element 5 and the second timing element 6 have the same basic design, the delay at the second timing element 6 will be substantially the same as the delay at the first timing element 5. Even though such electrical test pulses are also delayed by the second timing element 6, they are still the first electrical pulses to reach the time difference measuring and analyzer mechanism 7, providing such inductive sensor 1 is functionally intact. The time difference measuring or analyzer mechanism 7 now compares the two receiving times and determines the time difference between such two receiving times. The time difference determined by such time difference measuring or analyzer mechanism 7 must not fall short of a certain predetermined value, yet such time difference determined must not exceed another predetermined value. Not until the time difference is determined, by the time difference measuring or analyzer mechanism 7, to be within a certain range tolerance will the circuit of such inductive sensor 1 be judged to be in working order.

On the other hand, if one of the first connecting line 2 on the second connecting line 3 is interrupted for any reason, the time difference determined in the time difference measuring or analyzer mechanism 7 would exceed the permissible range tolerance. In that event, the time difference measuring or analyzer mechanism 7 would generate an electrical fault signal. When such electrical fault signal is generated, it is fed from an output terminal of the time difference measuring or analyzer mechanism 7 via an electrical connecting line 8 to an input terminal of an amplification circuit 9. In turn, such amplification circuit 9 via its output terminals and electrical connecting lines activates a disconnect device 10 and/or a signaling device 11. In this manner, the respective channel of a vehicle anti-lock brake system can be disabled with the disconnect device 10. In addition, and at the same time, the signaling device 11 can communicate the malfunction of the affected inductive sensor 1 to the operator of such vehicle.

In addition to an interruption occurring in one of the first connecting line 2 or the second connecting line 3, it is also conceivable that a short circuit may be present in any one of the inductive sensor 1 or the first connecting line 2 on the second connecting line 3. In the case of such a short circuit, the test signal would not normally be affected by the inductivity of the inductive sensor 1 and the associated capacitor 4. In this manner, such electrical test signals would not be detected with the required time interval by the time difference measuring or analyzer mechanism 7. However, in the absence of the required time interval between the electrical test signals being received, the time difference measuring or analyzer device 7 will likewise generate an electrical fault signal which will cause a disconnect and/or a warning signal as described above.

As can be seen from the above description, the control circuit according to the present invention permits an uncomplicated monitoring of the inductive sensor 1 during an operating function of such inductive sensor 1. This is essentially accomplished with a minimum of additional devices being required in the control circuit. For example, the required capacitor 4 will usually be available in the control circuit in the form of a filter capacitor. Such filter capacitor being present in the control circuit to suppress the inferential pulse of the inductive sensor 1 electrical signals. In addition, the first timing element 5 will generally be available in such control circuit as an electrical signal filtering device. Consequently, in the present invention, the realization of this sensor-fault detection circuit will generally require nothing more than a time difference measuring or analyzer circuit mechanism 7 and a test-signal generator circuit.

As has been illustrated in FIG. 1, these particular circuits can be achieved in a very cost-efficient manner through the provision of an integrated circuit.

It should also be recognized by persons skilled in the art that, when the control circuit of a vehicle anti-lock braking system which includes a microprocessor is taken into consideration, then it is further possible to achieve these circuit elements within the existing microprocessor by providing an appropriate software package for such microprocessor.

Figure 2:
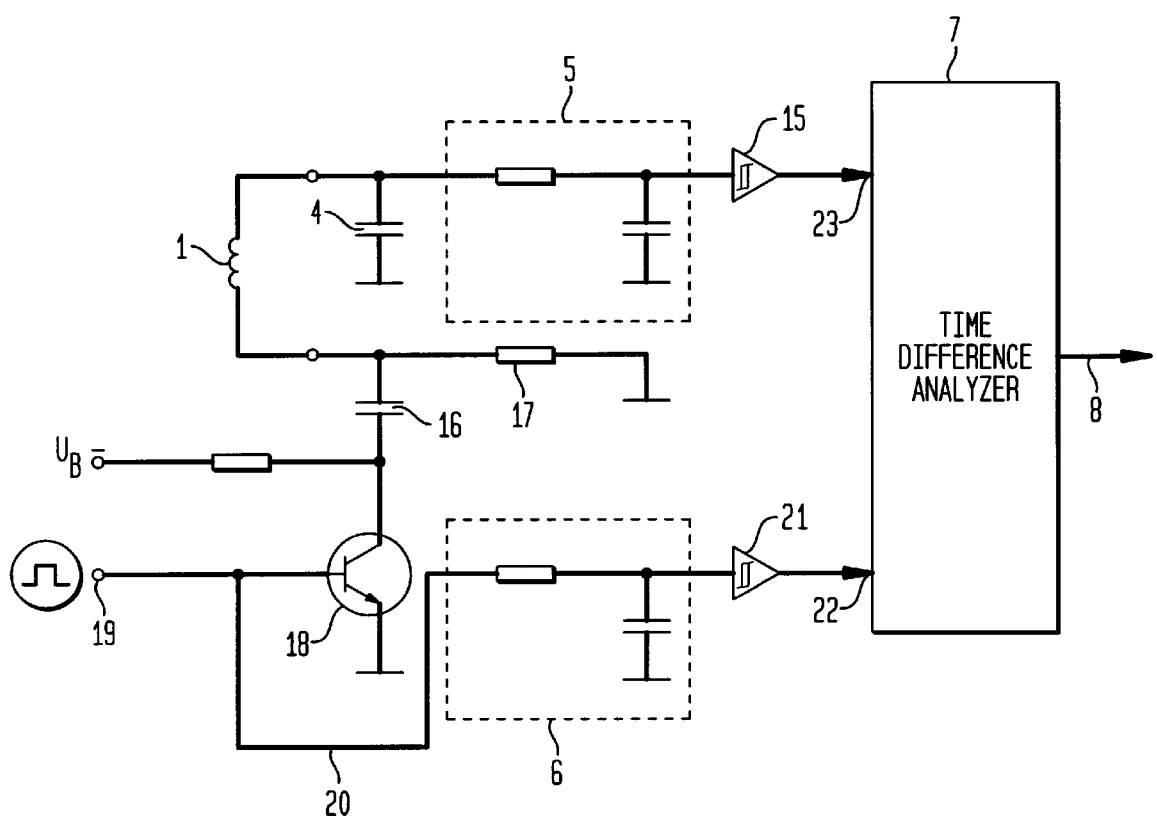
FIG. 2 is a more detailed circuit diagram of the sensor-fault detection circuit illustrated in FIG. 1.

Attention is now directed to FIG. 2 which illustrates a circuit diagram of a sensor-fault detection circuit. In particular, FIG. 2 illustrates a test circuit for use with an inductive sensor 1 utilized in a vehicle anti-lock braking system. Essentially, the test circuit is comprised of an inductive sensor 1 circuit and an input circuit for the electrical test signal.

According to the present invention, the test circuit includes the inductive sensor 1. The inductive sensor 1 is electrically connected to a capacitor 4. The capacitor 4 serves as a high-pass filter. At the same time such inductive sensor 1 is electrically connected to an RC device 5. Such RC device 5 represents both an electrical signal filter and a timing element. The output terminal of the RC device 5 is electrically connected with an input terminal of a Schmitt trigger element 15. Such Schmitt trigger element 15 at its output drives the time difference measuring or analyzer mechanism 7.

The second electrical connection of such inductive sensor 1 is electrically connected to a coupling capacitor 16 and concurrently to a resistor element 17. The input circuit is electrically connected to the circuit of the inductive sensor 1 by way of the coupling capacitor 16. This input circuit is comprised of a transistor amplifier 18, emitter-coupled as an electrical pulse generator, which at its input side is electrically connected to a trigger pulse electrical connection. By way of a connecting line 20, there branches off from the control pulse connection 20 the other branch of the inductive sensor 1 circuit which includes a second RC element 6 which serves as a timing element that leads to the time difference measuring or analyzer mechanism 7 via a Schmitt trigger element 21.

The fault detection circuit for the inductive sensor 1, as illustrated in FIG. 2, essentially functions in the same manner as the fault detection circuit illustrated in FIG. 2. The only significant difference is the addition of an electrical signal amplification device for the electrical test pulses. The electrical signal amplification circuit is driven by way of the electrical test signal connection 19. In this particular arrangement, the amplified electrical test signal is fed into the circuit for the inductive sensor 9 by way of the coupling capacitor 16. The test voltage electrical pulses present at the RC elements 5 and 6 are passed to two Schmitt triggers 15 and 21. In such Schmitt triggers 15 and 21, these test voltage electrical pulses form amplified square-wave electrical pulses from the voltage peaks, which allows a digital analysis in the time difference measuring or analyzer mechanism 7.

It is to be understood that the fault detection circuit for sensors as described above with respect to FIGS. 1 and 2 are not limited to inductive-type sensors only, but can, in principle, be utilized with capacitive-type sensors as well. In this instance, it is only required to configure the timing elements accordingly. Furthermore, these sensor-fault detection circuits are not to be construed to be limited to being employed in a vehicle anti-lock braking system control circuits. These sensor-fault detection circuits can in fact be used in any sensor circuit whose sensors are comprised of either an inductive-type or capacitive-type element. Additional timing elements are likewise not absolutely necessary in such sensor circuits. A timing element would be sufficient, in any case, which is formed from the impedance of the sensor and an additional capacitive or inductive component.

While a presently preferred embodiment of a fault-detection circuit for a sensor has been described in detail above, it should be understood by persons skilled in the electronic sensor art that various other modifications and adaptions of such fault-detection circuit can be made without departing from the spirit and scope of the appended claims.

I claim:

1. A sensor-fault detection circuit for detecting faults in a sensor, said sensor having an input and an output, comprising a test signal generator for outputting a test signal to said input of said sensor, a time measuring device, with a first input connected commonly to said test signal and said sensor input, which receives said test signal at said first input, said time measuring device having a second input connected to said output of said sensor, which receives said test signal at said second input after it has been delayed by passing through said sensor, and said time measuring device measuring the time difference between when said first input receives said test signal and when said second input receives said delayed test signal, and producing a fault signal when said time difference is not within a predetermined range.

2. The sensor-fault detection circuit of claim 1 wherein said sensor is an inductive sensor.

3. The sensor-fault detection circuit of claim 1 wherein said sensor is a capacitive sensor.

4. The sensor-fault detection circuit of claim 1, further comprising a capacitor connected from said sensor output to ground.

5. The sensor-fault detection circuit of claim 4 wherein said sensor is an inductive rod sensor for determining rotational speed of a vehicle wheel.

6. The sensor-fault detection circuit of claim 4, further comprising a first timing element having a first predetermined delay, said first timing element being serially connected between said sensor output and said second input of said time measuring device, said first timing element for outputting said test signal, after it has been delayed by passing through said sensor and said first predetermined delay, to said second input of said time measuring device, a second timing element having a second predetermined delay, said second timing element being serially connected between said test signal generator output and said first input of said time measuring device, said second timing element for outputting said test signal, after it has been delayed by said second predetermined delay, to said first input of said time measuring device, and said time measuring device measuring a time difference between when said delayed signal is received at said second input and when said delayed signal is received at said first input, and outputting said fault signal if said time difference is not within a predetermined range.

7. The sensor fault-detection circuit of claim 6 wherein said first and second predetermined delays are substantially equal.

8. The sensor-fault detection circuit of claim 6, further comprising a disconnecting device connected to an output of said time measuring device, a warning device connected to said output of said time measuring device, and wherein said time measuring device outputs said fault signal to said disconnecting device to disconnect said sensor circuit, and wherein said time measuring device outputs said fault signal to said warning device to display an error, when said time difference is not within said predetermined range.

9. The sensor-fault detection circuit of claim 4 wherein said sensor and said capacitor comprise a timing element having a predetermined delay.

10. The sensor-fault detection circuit of claim 8, further comprising an amplification circuit having an input connected to said output of said time measuring device, said amplification circuit having a first output connected to said disconnecting device, and having a second output connected to said warning device.

11. The sensor-fault detection circuit of claim 6 wherein said first timing element comprises a first resistor connected to a first capacitor, and said second timing element comprises a second resistor connected to a second capacitor.

12. The sensor-fault detection circuit of claim 6 wherein said capacitor connected from said sensor output to ground is a filtering capacitor, and wherein said first timing element is an electrical signal filter.

13. The sensor-fault detection circuit of claim 1 further comprising an inductive wheel speed sensor having an input and an output, a capacitor electrically connected between said output of said inductive sensor and ground, a first timing element having a first predetermined delay and an input connected to said output of said inductive sensor, a first trigger element having an input connected to an output of said first timing element, said time measuring device having a first input and a second input, said second input connected to an output of said first trigger element, a coupling capacitor connected to said input of said inductive sensor, a resistor connected between said input of said inductive sensor and ground, said input circuit electrically connected to said inductive sensor via said coupling capacitor, a second timing element having a second predetermined delay and an input connected to said input circuit test signal, and a second trigger element having an input connected to an output of said second timing element and an output connected to said first input of said time measuring device.

14. The sensor-fault detection circuit of claim 13 wherein said first timing element comprises a first resistor connected to a first capacitor, and wherein said second timing element comprises a second resistor connected to a second capacitor, and wherein said capacitor connected to said inductive sensor output serves as a high pass filter.

15. The sensor-fault detection circuit of claim 13 wherein said input circuit comprises a transistor amplifier having a collector coupled as an electrical pulse generator to said coupling capacitor, and a test signal generator connected to an input of said transistor amplifier and to an input of said second timing element.

16. A method for detecting faults in a sensor, comprising generating a test signal, simultaneously transmitting said test signal to an input of said sensor and to a first input of a time measuring device, outputting said test signal from an output of said sensor, after it has been delayed by passing through said sensor, to a second input of said time measuring device, and determining a time difference between said delayed test signal at said second input and said test signal at said first input, and issuing an error signal if said time difference is not within a predetermined range.

17. The method according to claim 16, further comprising transmitting said test signal, after it has been delayed by said sensor transit time, from said sensor output to a first timing element, delaying said test signal, after it has been delayed by said sensor transit time, through said first timing element, outputting said test signal, after it has been delayed by said sensor transit time and said first timing element, from said first timing element to said second input of said time measuring device, transmitting said test signal to a second timing element, delaying said test signal through said second timing element, and outputting said test signal, after it has been delayed by said second timing element, from said second timing element to said first input of said time measuring device.

18. The method according to claim 17 wherein said sensor measures wheel speed in a vehicle anti-lock brake system, and wherein said anti-lock brake system is disconnected if said error signal is issued.

19. The method according to claim 17, further comprising displaying an error if said error signal is issued.

20. A method for detecting faults in a sensor having an input and an output, comprising generating and transmitting a test signal to said sensor input, receiving said test signal from said sensor output after said test signal has been delayed by passing through said sensor, measuring the time difference between the time when said test signal is generated and the time when said test signal is received, determining the existence of faults based on said time difference measurement, and generating a disconnect signal and an error signal if said time difference measurement is not within a predetermined range.

* * * * *